(No Model.)
J. ATKINSON & C. F. PLUNKETT.
PIPE COUPLING FOR WATER CLOSET BOWLS, &c.
No. 575,583. Patented Jan. 19, 1897.
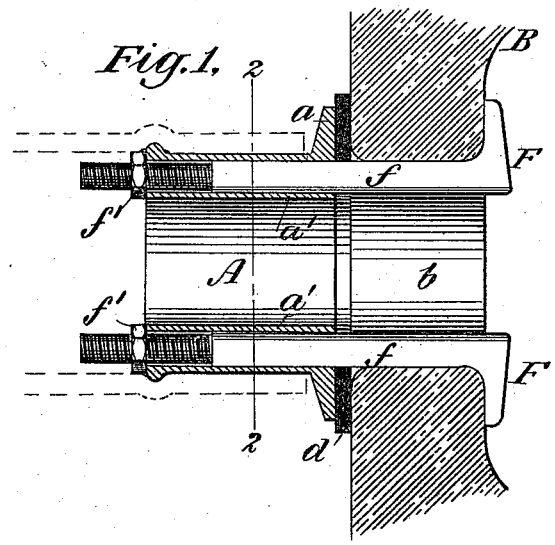
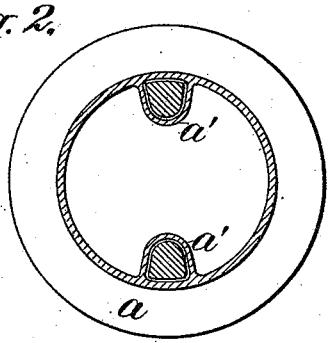
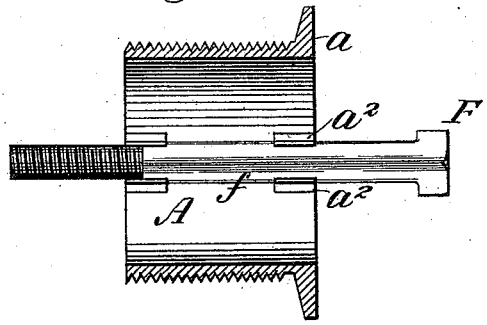 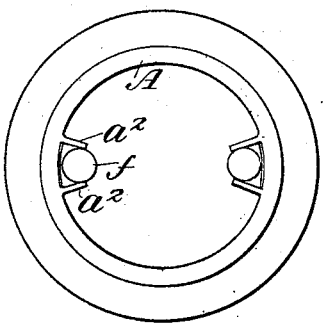
WITNESSES:
INVENTORS
John Atkinson and
Christopher F. Plunkett
BY
Howson & Howson
their ATTORNEYS

UNITED STATES PATENT OFFICE.

JOHN ATKINSON AND CHRISTOPHER F. PLUNKETT, OF NEW YORK, N. Y.

PIPE-COUPLING FOR WATER-CLOSET BOWLS, &c.

SPECIFICATION forming part of Letters Patent No. 575,583, dated January 19, 1897.

Application filed February 8, 1896. Serial No. 578,489. (No model.)

*To all whom it may concern:*

Be it known that we, JOHN ATKINSON and CHRISTOPHER F. PLUNKETT, of New York city, New York, have invented Improved Pipe-Couplings for Water-Closet Bowls, &c., of which the following is a specification.

Our invention consists of an improved pipe-coupling which, while applicable in various connections, is specially adapted to connect water-pipes to earthenware or other bowls, such as water-closets, either where the bowls are in the first place constructed for such application or by way of repair.

The object of our invention is to construct a simple, strong, and efficient pipe connection of this character which can be applied without special skill, and will make a good joint, will require no extra parts for connection with the main piping, and will not interfere with the flow of water through the connection.

In the accompanying drawings, Figure 1 is a section showing the several parts of the coupling in place. Fig. 2 is a section through the line 2 2 of Fig. 1. Fig. 3 is a longitudinal section, and Fig. 4 an end view of a modification.

In Fig. 1, B represents the bowl or other part to which the piping is to be connected by means of the coupling. As the coupling is especially applicable to the connection of the water-supply pipe to the earthenware bowl of water-closets, either where the bowl is specially constructed for this character of connection or where a cracked or broken "horn" requires the connection to be repaired, we will, for convenience, refer to the part B as the "bowl," the opening $b$ therein being for the passage of water to flush the bowl. In case of repair of an old-style bowl the horn of the bowl is to be chipped off, as will be understood.

The main body of our coupling consists of a short tube A, having either a plain outer face, as shown in Figs. 1 and 2, or threaded for connection with a standard elbow through a reducer-coupling or otherwise. When the tube A is plain, it can have a rubber connection sleeved over it, as indicated in dotted lines in Fig. 1.

The tube A is provided with a flanged end $a$ to bear against the edge of the opening of the bowl B, with an intermediate gasket $d$.

In the tube A are two or more guides $a'$ of polygonal cross-section to receive the stems $f$ (of the same section) of hooks F, which engage with the shoulders of the water-inlet of the bowl B. The outer ends of the stems $f$ are threaded to receive nuts $f'$ to tighten up the hooks F and flange $a$ against the bowl B to make a tight joint.

Figs. 3 and 4 show the guides for the stems $f$ as formed by projections $a^2 a^2$, cast with the tube A.

We claim as our invention—

1. A pipe connection comprising a tube having guides therein in combination with hooks, having stems adapted to pass through the guides, but not free to turn therein, the ends of the stems being threaded and securing-nuts therefor substantially as set forth.

2. A pipe connection comprising a tube having guides of polygonal shape, in combination with hooks having stems of the same cross-section as the guides, the ends of the stems being threaded and securing-nuts therefor substantially as set forth.

3. A pipe connection comprising a tube having projections cast therewith to form guides of polygonal shape, in combination with hooks having stems of the same cross-section as the said guides, the ends of the stems being threaded and securing-nuts therefor substantially as set forth.

In testimony whereof we have signed our names to this specification in the presence of two subscribing witnesses.

JOHN ATKINSON.
CHRISTOPHER F. PLUNKETT.

Witnesses:
EDITH J. GRISWOLD,
HUBERT HOWSON.